(12) United States Patent
Frank

(10) Patent No.: US 6,814,381 B1
(45) Date of Patent: Nov. 9, 2004

(54) VEHICLE WITH BUMPER AND DEFORMATION ELEMENT

(75) Inventor: Simon Frank, Tengen (DE)

(73) Assignee: Alcan Technology & Management Ltd. (CH)

( * ) Notice: Subject to any disclaimer, the term of this patent is extended or adjusted under 35 U.S.C. 154(b) by 0 days.

(21) Appl. No.: 10/658,474

(22) Filed: Sep. 9, 2003

Related U.S. Application Data

(62) Division of application No. 10/077,668, filed on Feb. 14, 2002, now Pat. No. 6,648,385.

(30) Foreign Application Priority Data

Feb. 21, 2001 (EP) ............................................ 01810184

(51) Int. Cl.[7] ................................................ B60R 19/34
(52) U.S. Cl. ........................ 293/133; 293/132; 293/120
(58) Field of Search ................................. 293/133, 120, 293/122, 102; 296/186, 189

(56) References Cited

U.S. PATENT DOCUMENTS

| | | | | |
|---|---|---|---|---|
| 3,831,997 A | * | 8/1974 | Myers | 293/133 |
| 3,842,222 A | * | 10/1974 | Hogland | 293/133 |
| 3,860,258 A | * | 1/1975 | Feustel et al. | 293/133 |
| 3,897,095 A | * | 7/1975 | Glance et al. | 293/120 |
| 3,912,295 A | * | 10/1975 | Eggert, Jr. | 293/133 |
| 3,998,485 A | * | 12/1976 | Putter et al. | 293/133 |
| 4,023,652 A | * | 5/1977 | Torke | 293/133 |
| 4,190,276 A | * | 2/1980 | Hirano et al. | 293/133 |
| 4,272,114 A | * | 6/1981 | Hirano et al. | 293/133 |
| 4,413,856 A | * | 11/1983 | McMahan et al. | 293/120 |
| 4,465,312 A | * | 8/1984 | Werner | 293/133 |
| 4,684,151 A | * | 8/1987 | Drewek | 296/189 |
| 4,702,515 A | * | 10/1987 | Kato et al. | 296/187.03 |
| 5,078,439 A | * | 1/1992 | Terada et al. | 293/122 |
| 5,201,912 A | * | 4/1993 | Terada et al. | 293/133 |

(List continued on next page.)

FOREIGN PATENT DOCUMENTS

| | | | |
|---|---|---|---|
| DE | 19517921 | * | 11/1996 |
| DE | 19700022 | * | 7/1998 |
| DE | 19913078 | * | 9/2000 |
| EP | 546 352 | | 6/1993 |
| EP | 0854066 | * | 12/1997 |
| JP | 55-136660 | | 10/1980 |
| JP | 2-175452 | * | 7/1990 |
| JP | 11-208393 | | 8/1999 |
| JP | 11-268663 | * | 10/1999 |
| JP | 2002-104107 | * | 4/2002 |
| WO | WO 98/39197 | | 9/1998 |

*Primary Examiner*—Kiran Patel
(74) *Attorney, Agent, or Firm*—Ostrolenk, Faber, Gerb & Soffen, LLP

(57) ABSTRACT

In a vehicle with bumper which is attached to the vehicle transverse to the longitudinal direction of the vehicle via a deformation element (10) the deformation element (10) exhibits two first side walls (28, 30) that are spaced apart, and are joined to second side walls (40,42) that are spaced apart.

The first and second side walls (28, 30, 40, 42) feature first and second grooves (48a,b, 50a,b; 50a,b, 54a,b) that run transverse to the longitudinal direction of the vehicle and are arranged in pairs opposite each other, each in a common plane. The first grooves (48a,b, 58a,b) extend over the whole breadth of the first side walls (28, 30) and the second grooves (52a,b, 54a,b) extend over only a middle part of the second side walls (40,42), leaving a region free at both edges. The first grooves (48a,b, 58a,b) are arranged in pairs in first planes and the second grooves (52a,b, 54a,b) are arranged in pairs in second planes situated between two subsequent first planes.

The deformation element exhibits a high capacity for absorbing the energy of deformation on collision with the bumper, and leads to essentially symmetric deformation.

1 Claim, 3 Drawing Sheets

U.S. PATENT DOCUMENTS

| | | | |
|---|---|---|---|
| 5,314,229 A | * 5/1994 | Matuzawa et al. | 293/133 |
| 5,403,049 A | * 4/1995 | Ebbinghaus | 293/133 |
| 5,429,388 A | * 7/1995 | Wheatley et al. | 296/187.09 |
| 5,431,445 A | * 7/1995 | Wheatley | 296/189 |
| 5,732,801 A | * 3/1998 | Gertz | 293/133 |
| 5,772,267 A | * 6/1998 | Heim et al. | 293/133 |
| 5,853,195 A | * 12/1998 | Le et al. | 296/189 |
| 5,876,077 A | 3/1999 | Miskech et al. | |
| 5,876,078 A | * 3/1999 | Miskech et al. | 293/133 |
| 6,003,934 A | * 12/1999 | Usui | 296/203.02 |
| 6,106,039 A | * 8/2000 | Maki | 293/133 |
| 6,152,521 A | * 11/2000 | Hayashi et al. | 296/188 |
| 6,174,009 B1 | * 1/2001 | McKeon | 293/133 |
| 6,179,355 B1 | * 1/2001 | Chou et al. | 293/133 |
| 6,203,079 B1 | * 3/2001 | Breed | 293/132 |
| 6,203,098 B1 | * 3/2001 | Motozawa et al. | 293/133 |
| 6,227,582 B1 | * 5/2001 | Ichien | 293/133 |
| 6,299,226 B1 | * 10/2001 | Kroning et al. | 293/120 |
| 6,474,709 B2 | * 11/2002 | Artner | 293/133 |
| 6,595,502 B2 | * 7/2003 | Koch et al. | 293/133 |
| 6,672,438 B2 | * 1/2004 | Beck | 293/133 |
| 2001/0011833 A1 | * 8/2001 | Artner et al. | 296/189 |
| 2001/0013706 A1 | * 8/2001 | Artner | 293/133 |

* cited by examiner

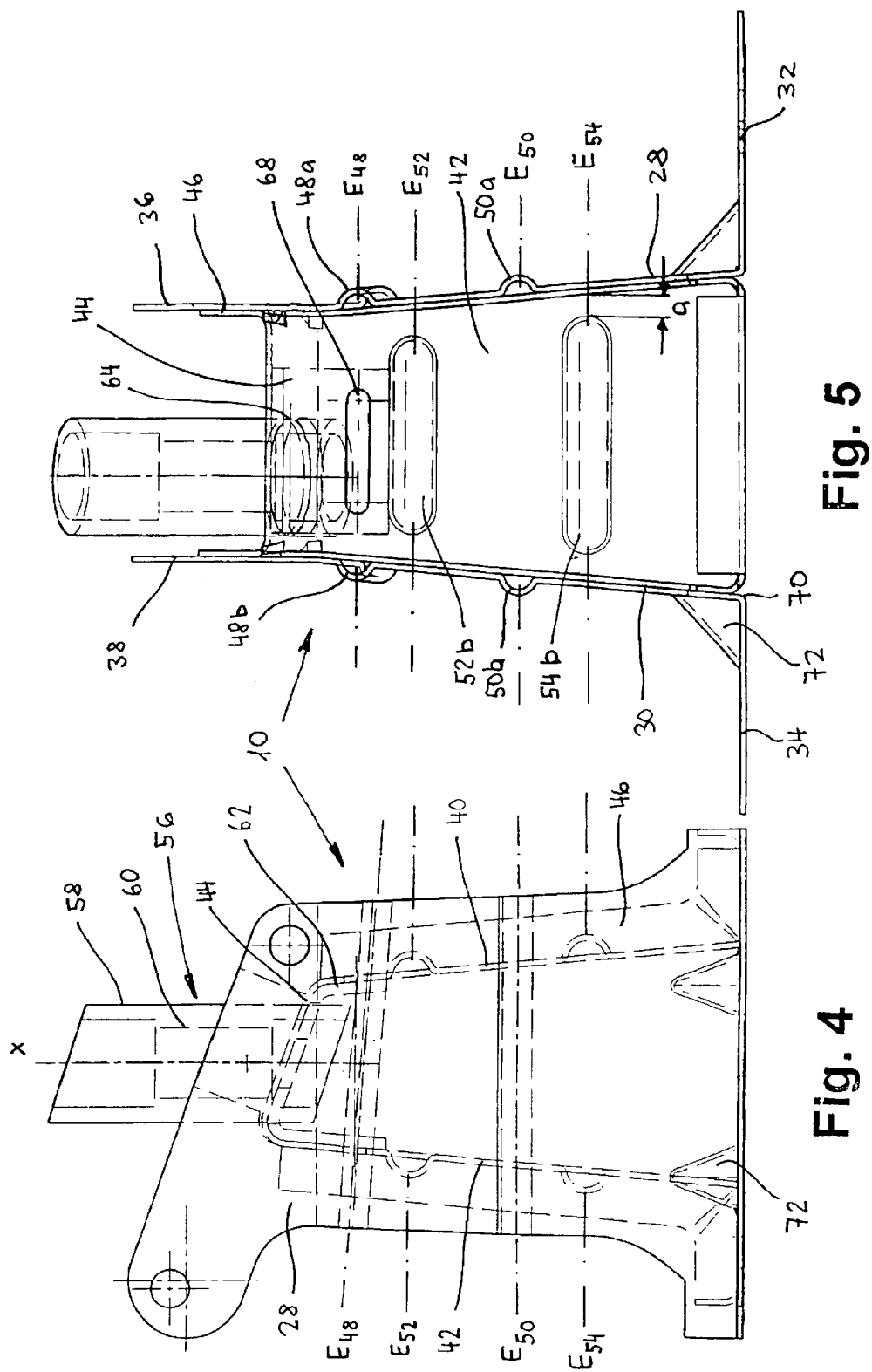

VEHICLE WITH BUMPER AND DEFORMATION ELEMENT

PRIORITY CLAIM

This is a divisional application of U.S. Application Ser. No. 10/077,668, filed Feb. 14, 2002 now U.S. Pat. No. 6,648,385, which claims priority to:

Country: Europe, Application No. 01810184.0, Filed: Feb. 21, 2001.

BACKGROUND OF THE INVENTION

The invention relates to a vehicle with a bumper which is attached to the vehicle transverse to the longitudinal direction of the vehicle via at least one deformation element. The deformation element exhibits two first side walls that are spaced apart, and are jointed together via two second side walls that are spaced apart. The first and second side walls feature first and second grooves that run transverse to the longitudinal direction of the vehicle and are arranged in pairs opposite each other, each in a common plane.

A variety of means for attaching a bumper to a vehicle are known. In order to increase the energy absorbing capacity of the bumper in an accident, it is also known to attach the bumper to the longitudinal beams of the vehicle via deformation elements.

In a known deformation element of the kind mentioned above, two essentially U-shaped parts made of steel sheet are fitted together to make a closed cross-section such that the flanges of the U-shaped parts overlap in pairs, and are joined together by resistance welding at these overlapping regions. Grooves are provided on all four side walls over the whole breadth of the side walls, whereby the first and second grooves lie in the first and second side walls, all in the same plane.

The above mentioned deformation elements according to the state of the art do not exhibit excellent capacity for absorbing energy on collision with the bumper. A further disadvantage of the above mentioned known deformation element is the accumulation of material in the middle of the two side walls, which on collision results in pronounced asymmetric deformation of the deformation elements bending away from the general longitudinal direction of the vehicle.

SUMMARY OF THE INVENTION

The object of the present invention is to develop further a deformation element of the kind mentioned above, in such a way that the capacity to absorb the energy of deformation developed on collision with the bumper is greater than with comparable deformation elements. In addition, the deformation element should be simple and cost favorable to produce.

That objective is achieved by way of the invention in that the first grooves extend over the whole breadth of the first side walls, and the second grooves extend over only a middle part of the second side walls, leaving a free region at both edges, whereby the first grooves are arranged in pairs in first planes and the second grooves are arranged in pairs in second planes situated between two subsequent first planes.

The arrangement according to the invention of the grooves in the side walls leads to an increase in the capacity to absorb energy of deformation developed on collision with the bumper. As a result of the second grooves in the second side walls arranged between first grooves in the planes of the first side wails—which in contrast to the first grooves do not extend over the whole breadth of the side walls—deformation initiated by the first grooves is limited by preventing inward directed folding, and further absorption of energy takes place but not until a second step by further deformation up to the next plane with further first grooves. The deformation behaviour of the deformation element according to the invention is improved further in that—in contrast to the state of the art deformation element mentioned at the start—the accumulation of material does not lie in the middle of the side wall areas but in the peripheral areas of the box-like deformation element.

The first and/or the second side walls are preferably inclined in pairs running together in the longitudinal direction of the vehicle. The result of this is that, on towing the vehicle in curves—when the direction of pulling is different from the longitudinal axis of the vehicle—the force being transferred from the longitudinal beam to the towing bracket runs through one of the two first side walls. On the other hand the transfer of force in a collision, preceded by a braking action in which the bumper is lowered, takes place via one of the second side walls.

Usefully, the second side walls are joined together at the end facing the bumper via a strut running transverse to the longitudinal direction of the vehicle. This results in a single middle part which as a whole is simpler to manufacture.

The strut preferably exhibits an opening and a tube-shaped part which on the one hand penetrates the opening and is attached to an insert that rests against the inside of the second side walls and strut and is fixed to the second side walls and/or strut, and on the other hand features an inner thread for releasably screwing in a towing hook.

At their ends remote from the bumper, the first and/or the second side walls are preferably bent outwards in the form of a flange to form an integral attachment plate, while forming an edge.

Reinforcing grooves may run transverse to the edges formed by bending. These prevent possible deformation of the deformation element in the region of the flange.

Usefully, bent connecting strips on the second side walls lie against and are joined to the inside of the first side walls.

At the end facing the bumper, the first side walls are usefully shaped to form an attachment means for the purpose of attaching the bumper.

Under collision conditions, in order to prevent the deformation element from deforming first in the region of the connection to the longitudinal beam of the vehicle, and instead as close as possible to the bumper mounting, at least one pair of the first grooves situated in the region of the first side walls remote from the bumper can be pressed flat at the edges.

The bumper is preferably a section made of an aluminium alloy, the deformation element is usefully made of steel sheet.

BRIEF DESCRIPTION OF THE DRAWINGS

Further advantages, features and details of the invention are revealed in the following description of preferred exemplified embodiments and with the aid of the drawing which shows schematically in:

FIG. 4 a side view of the deformation element in FIG. 2, viewed in direction A; and FIG. 5 a side view of the deformation element in FIG. 2, viewed in direction B.

DETAILED DESCRIPTION OF THE PREFERRED EMBODIMENTS

Figure 1:
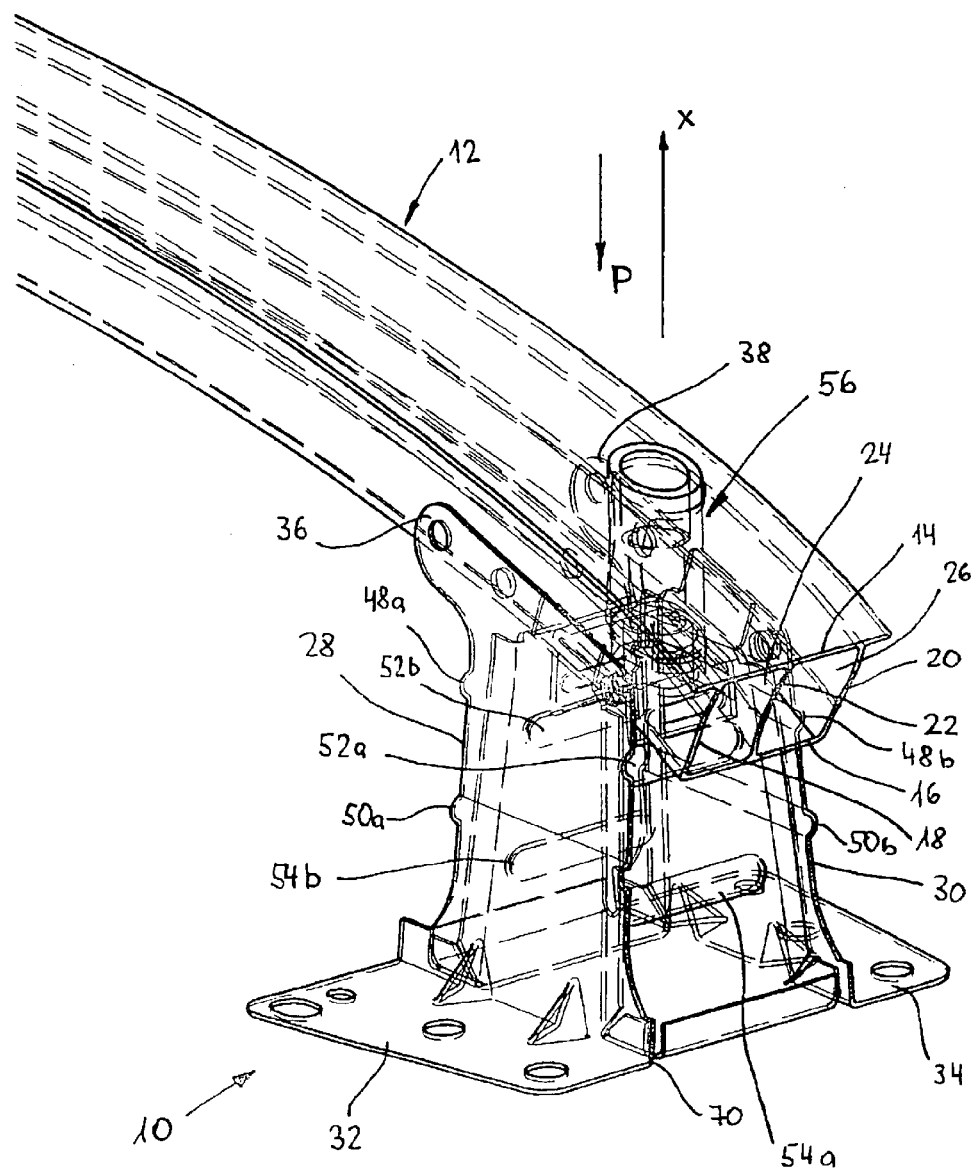
FIG. 1 a perspective view of a deformation element with a bumper.
Figure 2:
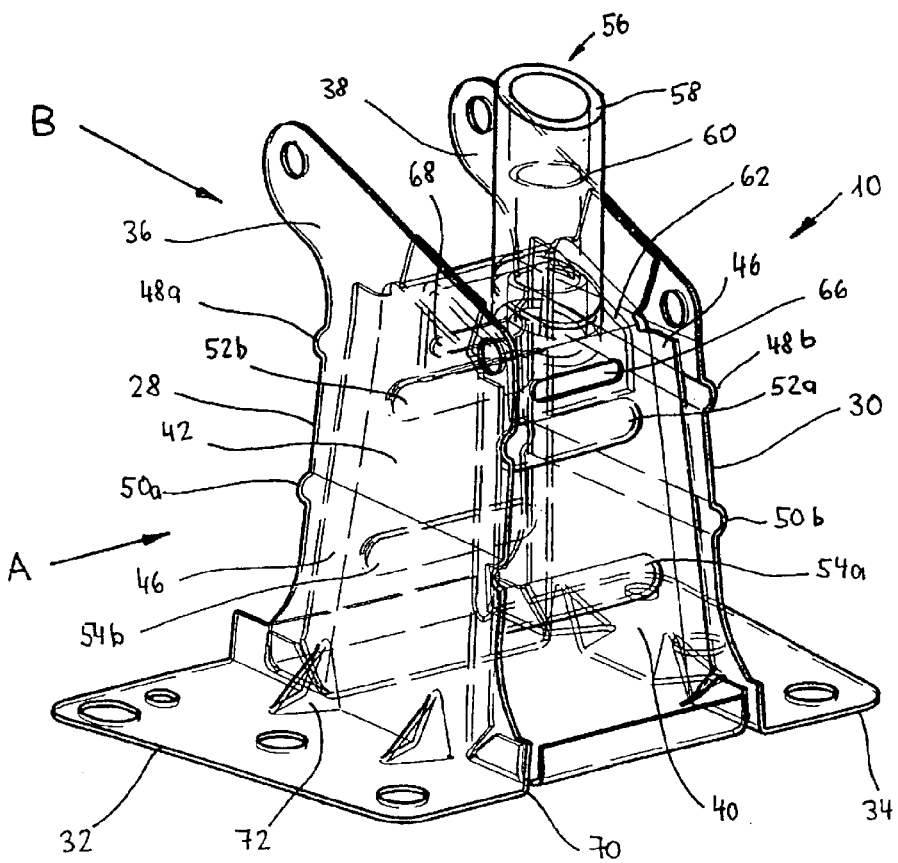
FIG. 2 the deformation element in FIG. 1 shown enlarged.
Figure 3:
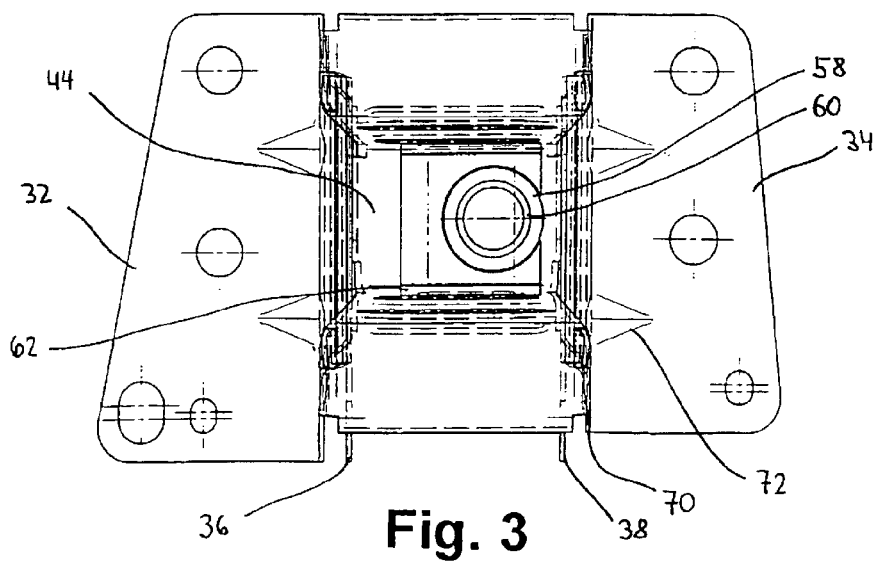
FIG. 3 an end view of the deformation element in FIG. 2 viewed in the longitudinal direction x of the vehicle.

A deformation element 10 shown in FIGS. 1 to 5—also known as a crash box—supports, as shown in FIG. 1, a bumper 12 of a private car which for reasons of simplicity is not illustrated here. Also not shown in the drawing is the longitudinal beam to which the deformation element 10 is attached. The bumper 12 is made e.g. of an extruded aluminium section and, as shown in FIG. 1, features two section walls 14, 16 which are spaced apart and are complimented by transverse walls 18, 20 to make up a box-shaped hollow section. When installed, the section wall 14 facing away from the vehicle is the outer or compression strut which is impacted on collision, and the section wall 16 facing the vehicle is the inner or tensile strut.

In the middle, between the two transverse walls 18, 20 is a transverse strut 22 which joins the section walls 12, 14 and divides the box-shaped hollow section of the bumper 12 into two chambers 24, 26. These chambers form deforming parts which are deformed when a frontal force P acts on the bumper 12 thereby dissipating a first part of the energy of impact.

The deformation element 10 shown in FIGS. 1-5 is the element mounted on the longitudinal beam on the right hand side of the vehicle looking in the longitudinal direction x of the vehicle. The deformation element on the left hand side of the vehicle is the mirror image of the element described here.

The deformation element 10 features two first side walls 28, 30 which are bent outward at the end remote from the bumper 12 forming a flange 32, 34. These flanges serve the purpose of screwing the deformation element 10 to a vehicle longitudinal beam whereby, when the deformation element is in the installed position, the flange 32 is arranged upwards as viewed in the longitudinal direction of the vehicle and flange 34 is arranged pointing downward. The end of the first side walls 28, 30 facing the bumper 12 is made in the form of a projection 36, 38 for attachment purposes.

The first side walls 28, 30 which are spaced apart are joined together via two second side walls 40, 42 which are also spaced apart, whereby the first and second side walls 28, 30, 40, 42 are inclined towards each other in pairs in the longitudinal direction of the vehicle. The second side walls 40, 42 are joined together at their ends facing the bumper via a strut 44 running transverse to the longitudinal direction of the vehicle x. The edges of the two second side walls 40, 42 facing the two first side walls 28, 30 and the strut 44 are bent outwards to form connecting strips 46 that lie against the first side walls 28, 30 and are connected to the first side walls 28, 30 via the connecting strips 46 by means of resistance welding. To provide better rigidity, the ends of the side walls 40, 42 away from the strut 44 are bent outwards twice.

First grooves 48a, b and 50a, b are provided in the first side walls 28, 30 transverse to the longitudinal direction of the vehicle x and lie in pairs on a common plane $E_{48}$, $E_{50}$. These first grooves 48a, b and 50a, b are continuous and extend over the whole breadth of the side walls 28, 30.

The second side walls 40, 42 are provided with second grooves 52a, b and 54a, b, which likewise run transverse to the longitudinal direction of the vehicle x and lie in pairs on a common second plane $E_{52}$, $E_{54}$. These second grooves 52a, b and 54a, b extend over only a middle part of the second side walls 40, 42 and are at a distance a from the first side walls 28, 30.

Although the above example concerns two pairs each of grooves or two first and two second planes, depending on the design and size of the deformation element 10, there may be more than two first and second planes with first and second grooves.

In the example of a deformation element 10 shown in FIG. 1-5 a towing facility 56 is foreseen. This comprises essentially of a tube-shaped part 58 with an inner thread 60 for releasably screwing in a towing hook which is not shown in the drawing. At its end remote from the inner thread 60 the tube-shaped part 58 is welded to an insert 62, which in cross-section is approximately U-shaped and has the form of the inner cross-section of the second side walls 40, 42 and that of the strut joining them. On assembling the deformation element 10, the tube-shaped part 58 with welded on insert 62 is pushed from the open side of the middle part formed by the second side walls 40, 42 and the strut 44 through an appropriate opening 64 in the strut 44 up to the stop and welded in this position through slits 66, 68 provided in the second side walls 40, 42 for the purpose of fixing it to the strut 44. When the vehicle is towed, the tensile forces are transmitted to the longitudinal beams of the vehicle mainly via the first side walls 28, 30, therefore the edges 70 formed by folding the flanges 32, 34 on the first side walls 28, 30 are provided with reinforcing grooves 72 running transverse to them.

The three part exemplified embodiment of a deformation element 10 shown in FIGS. 1-5 is made of shape-formed steel sheet. After stamping and bending, the individual parts i.e. the two first side walls 28, 30 and the middle part made up of the two second side walls 40, 42 and the strut 44, these are joined to give the required shape of deformation element 10 by means of resistance welding.

What is claimed is:

1. A deformation element, comprising two first side walls that are spaced apart and are joined together by two second side walls that are spaced apart, the first and second side walls have first and second grooves that run transverse to the longitudinal direction of the vehicle and are arranged in pairs opposite each other, each in a common plane, the first grooves extend over an entire width of the first side walls and the second grooves extend over only a middle part of the second side walls, leaving a groove-free region at both edges, the first grooves being arranged in pairs in first planes and the second grooves being arranged in pairs in second planes situated between two subsequent first planes.

* * * * *